United States Patent [19]

Kuroki et al.

[11] Patent Number: 4,805,046
[45] Date of Patent: Feb. 14, 1989

[54] INFORMATION RECORDING AND REPRODUCING APPARATUS USING SECTORS DIVIDED INTO A PLURALITY OF FRAMES AND HAVING MEANS FOR PROPER STORAGE OF THE FRAME DATA

[75] Inventors: Yuzuru Kuroki, Toyonaka; Isao Satoh, Neyagawa; Makoto Ichinose, Sakai; Yoshihisa Fukushima, Osaka; Yuuji Takagi, Neyagawa, all of Japan

[73] Assignee: Matsushita Electric Industrial Co., Ltd., Osaka, Japan

[21] Appl. No.: 922,399

[22] Filed: Oct. 23, 1986

[30] Foreign Application Priority Data

Oct. 28, 1985 [JP] Japan ................................. 50-241057
Jan. 13, 1986 [JP] Japan ................................. 51-4502

[51] Int. Cl.$^4$ ............................................ G11B 5/09
[52] U.S. Cl. ...................................... 360/49; 360/48; 360/51
[58] Field of Search .......................... 360/48, 49, 51

[56] References Cited

U.S. PATENT DOCUMENTS

| | | | |
|---|---|---|---|
| 4,001,883 | 1/1977 | Strout et al. | 360/48 |
| 4,279,004 | 7/1981 | Yamashita et al. | 360/49 |
| 4,366,512 | 12/1982 | Janak et al. | 360/49 |
| 4,525,840 | 6/1985 | Heinz et al. | 360/51 |
| 4,620,300 | 10/1986 | Ogawa | 360/51 |
| 4,622,602 | 11/1986 | Kutaragi | 360/49 |

FOREIGN PATENT DOCUMENTS

59-185035 10/1984 Japan .

Primary Examiner—Vincent P. Canney
Assistant Examiner—Surinder Sachar
Attorney, Agent, or Firm—Stevens, Davis, Miller & Mosher

[57] ABSTRACT

An information recording and reproducing apparatus records and reproduces information on and from an optical recording disk having a sector recording format of frame structure in which data in each sector are divided into a plurality of frames, and a data head identification mark is affixed to the head of each of the frames, so as to prevent propagation of a demodulation error due to failure of word synchronization attributable to pull-out of a PLL during data reproduction. In the apparatus, one frame pulse is generated for each of the frames on the basis of a sector identifier detection signal and a frame data demodulation start signal, and, according to the result of counting the frame pulses, the frame numbers of frame data demodulated and stored in a sector buffer memory are accurately detected. The frame pulse is generated on the basis of the sector identifier detection signal until the data head identification signal is first detected, and, once the data head identification signal is detected, the frame pulse is generated on the basis of the data demodulation start signal. Therefore, even if the data head identification signal of a frame cannot be detected resulting in dropout of data in that frame, the succeeding frame data can be stored at the assigned addresses in the sector buffer memory.

6 Claims, 10 Drawing Sheets

INFORMATION RECORDING AND REPRODUCING APPARATUS USING SECTORS DIVIDED INTO A PLURALITY OF FRAMES AND HAVING MEANS FOR PROPER STORAGE OF THE FRAME DATA

BACKGROUND OF THE INVENTION

This invention relates to an information recording and reproducing apparatus for recording and reproducing information on and from a recording medium having a sector structure.

In an optical recording disk, optically detectable guide tracks such as guide grooves are provided concentrically or spirally in order to, for example, increase the recording track density and permit discrete, partial writing and erasure of information. A laser beam focused into a diameter less than or equal to 1 μm is directed onto a recording layer formed on the guide tracks to record information by pitting or changing the reflection factor or transmission factor.

Figure 11:
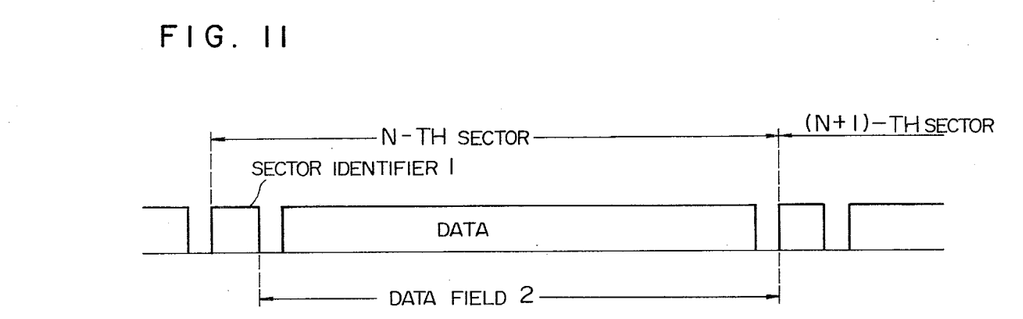
FIG. 11 shows one form of a format of sector structure.

To deal with recording of digital information where the length of data is variable, the guide track is divided into a plurality of sectors for recording and reproducing the digital information on and from each sector. An example of a format of sector structure is shown in FIG. 11. It will be seen in FIG. 11 that each of the sectors is composed of a sector identifier 1 including track address and sector address information and a data field 2 for recording information thereon and reproducing information therefrom.

The data field 2 is generally composed of a pull-in signal part for pulling in a PLL (phase locked loop), a data head identification mark (abbreviated hereinafter as a data mark) added before recorded data for identifying the head of the recorded data, and a data part. At the time of demodulation of data, the data mark is detected from a reproduced signal for attaining word synchronization for the purpose of data demodulation.

On the other hand, when various defects, dust, scars or the like are present in the base material, recording film, protective layer, etc., of the optical recording disk, dropouts occur in the reproduced signal. Since the diameter of the recording pits and the pitch of the tracks on the optical recording disk are very small or in the order of about 1 μm, a raw error rate is very bad or in the order of $10^{-4}$ to $10^{-5}$, and there are also many long burst-like dropouts. The operation of the PLL is frequently adversely affected by such burst-like dropouts. As a result, the word synchronization may become out of order at the time of demodulation of the data, and errors may occur on all the succeeding sector data.

Figure 12:
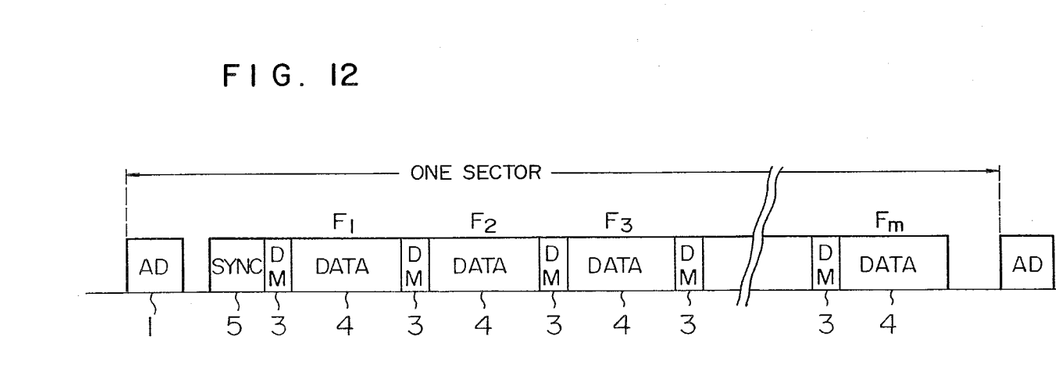
FIG. 12 shows one form of a sector format of frame structure.

With a view to solve such a problem, the inventors proposed in Japanese Patent Application No. 58-58157 to employ a sector format paving a frame structure in which each sector is divided into a plurality of information record units called frames hereinafter. Such a format will be explained with reference to FIG. 12. Referring to FIG. 12, data recorded in one sector is composed of data marks 3, m frames $F_1$ to $F_m$ each containing a data unit 4 obtained by dividing one-sector data by m, and a pull-in signal part 5 affixed to the head of the first frame $F_1$ for pulling in the PLL. Such a format is advantageous in that, even when the word synchronization becomes out of order at the time of data demodulation due to the presence of, for example, a long burst-like dropout as described above, the error is limited to only one frame unit, and normal demodulation can be carried out from the next frame.

As a data mark pattern, it is customary to utilize a special pattern different from that used in the conversion rule of modulation. For example, in the case of an MFM (modified frequency modulation) method, a modulation pattern such as a sequence of 2T, 1.5T and 2T (where T is the data rate) is not present and can therefore be easily discriminated from a row of modulated data.

Figure 13:
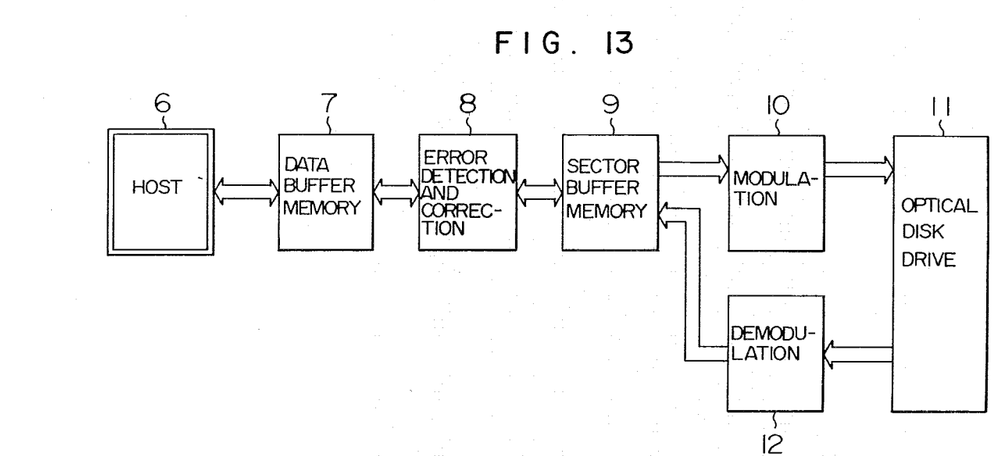
FIG. 13 is a block diagram showing a flow of data in an optical information recording and reproducing apparatus to which the present invention is applied.

FIG. 13 shows a flow of data in an optical information recording and reproducing apparatus. On write operation, user data supplied from a host 6 are temporarily stored in a data buffer memory 7, and after addition of an error correction code in an error detection and correction circuit 8, the data corresponding to one sector are stored in a sector buffer memory 9. The data are then modulated and formatted in a modulation circuit 10, and the sector formated data are recorded on an optical recording disk by an optical disk drive 11. During a read operation, the reproduced signal from the optical disk drive 11 is demodulated in a demodulation circuit 12, and the demodulated sector data are stored in the sector buffer memory 9. After error correction processing in the error detection and correction circuit 8, the data are transferred to the host 6 through the data buffer memory 7.

Figure 14:
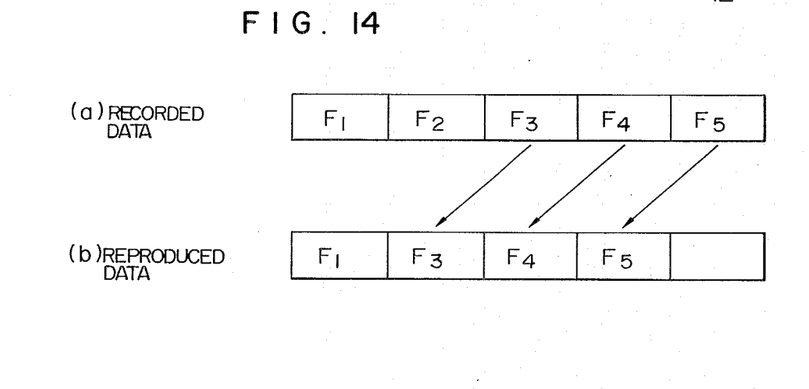
FIG. 14 illustrates how failure to detect a data mark at the time of data demodulation results in storage of data at wrong addresses in the sector buffer memory shown in FIG. 13.

However, when a data mark in the sector format of frame structure cannot be detected at the time of data demodulation due to the presence of, for example, a dropout, the data in that frame are not stored in the sector buffer memory 9. In such a case, the demodulated data in the succeeding frames will be stored at the successively-dislocated discrepant addresses, resulting in the storage of false data. Such a situation will be explained with reference to FIG. 14. It is supposed that the data corresponding to the frames $F_1$, $F_2$, $F_3$, $F_4$ and $F_5$ are stored in the sector buffer memory 9 as shown in FIG. 14(a), and, after modulation in the modulation circuit 10 shown in FIG. 13, the modulated data are recorded on an optical recording disk by the optical disk drive 11 shown in FIG. 13. It is supposed then that the data mark of the second frame $F_2$ is not detected at the time of data demodulation. In such a case, the data contained in and demodulated from the frame $F_2$ are not stored in the sector buffer memory 9 as reproduced data, as shown in FIG. 14(b). Also, the data in the frame $F_3$ are stored at the address at which the data in the frame $F_2$ are to be primarily stored. Similarly, the data in the frame $F_4$ are stored at the address at which the data in the frame $F_3$ are to be primarily stored, and the data in the frame $F_5$ are stored at the address at which the data in the frame $F_4$ are to be primarily stored. In the manner above described, the data in one frame are stored at an address at which the data in the next frame are to be stored. Thus, all the data in the frames starting from the frame $F_2$ are not stored at their assigned addresses.

SUMMARY OF THE INVENTION

With a view to obviate such a prior art defect, it is a primary object of the present invention to provide an information recording and reproducing apparatus in which, at the time of demodulation of data recorded according to the sector format of frame structure, the frame number of frame data to be stored in a sector buffer memory is accurately detected, so that, even when the data mark of a frame cannot be detected resulting in dropout of data in that frame, data in the succeeding frames can be stored at their assigned addresses in the sector buffer memory.

In accordance with the present invention, there is provided an information recording and reproducing apparatus for recording and reproducing data on and from a recording medium which has a sector structure and in which each sector is composed of a sector identifier including address information and a data field for recording data therein and reproducing data therefrom, the apparatus comprising: means for identifying the address information included in the sector identifier from a reproduced signal thereby identifying a sector from which recorded data are to be reproduced; means for recording a succession of plural information record units, each including modulated data and a data head identification mark detected for identification of the head of the modulated data, on the data field of each of the sectors; means for identifying the data head identification mark from a reproduced signal; means for generating a data demodulation start signal when the data head identification mark is detected; means for demodulating the data contained in each of the information record units in response to the data demodulation start signal and storing the demodulated data in a sector buffer memory; means for generating one frame pulse for each of the information record units; and means operative according to the result of counting the pulses to assign the head address of the data in each of the information record units to be stored in the sector buffer memory.

Therefore, even if the data head identification mark of a frame cannot be detected during reproduction of data from a recording medium having a sector format of a frame structure in which sector data are divided into a plurality of frames, and dropout of the data in that frame occurs, the succeeding frame data can be stored at their assigned positions in the sector buffer memory.

DESCRIPTION OF THE PREFERRED EMBODIMENTS

In the present invention, one pulse, (referred to hereinafter as a frame pulse) is generated for each of frames at the time of demodulation of sector data, and the number of such frame pulses is counted to recognize the frame number of a frame to be demodulated next.

In order to generate one frame pulse at every frame, one method which can be used has data marks of the individual frames detected, and the number of the data marks themselves or the number of pulses generated on the basis of the data marks is counted. However, when a data mark cannot be detected due to the presence of, for example, a dropout, the corresponding frame pulse cannot be generated. When the data mark that cannot be detected belongs to an intermediate frame in such a case, the frame pulse can be generated on the basis of the data mark detected in the preceding frame. However, this method cannot compensate dropout of the head frame in that sector. There is another method in which a timer is used to generate the frame pulse in the middle of each frame on the basis of the sector identifier at the position directly ahead of the data field. However, because of the tendency of changes in the sector length due to, for example, variations of the rotation speed of the disk motor or eccentricity of the disk, the accuracy of pulse generation in frames appearing later in the sector is degraded with the increase in the number of frames in one sector.

In the present invention, therefore, the frame pulse is generated on the basis of a signal indicative of detection of the sector identifier at the time of sector data demodulation until the data mark in that sector is first detected, and, once the data mark is detected, the frame pulse is generated on the basis of a data demodulation start signal produced on the basis of the data mark detection signal. When dropout of the data mark in an intermediate frame is detected, the data mark in the frame directly preceding that frame is substituted to recover the demodulated data and to compensate the frame pulse. Also, a gate signal for marking a spurious data mark that may appear in the data row is generated to ensure accurate timing of demodulation, so that one frame pulse can be generated for each of the frames. The manner of data mark substitution as described above is impossible when the data mark of the first frame cannot be detected. In such a case, the frame pulse is generated on the basis of the sector identifier of that sector.

Figure 1:
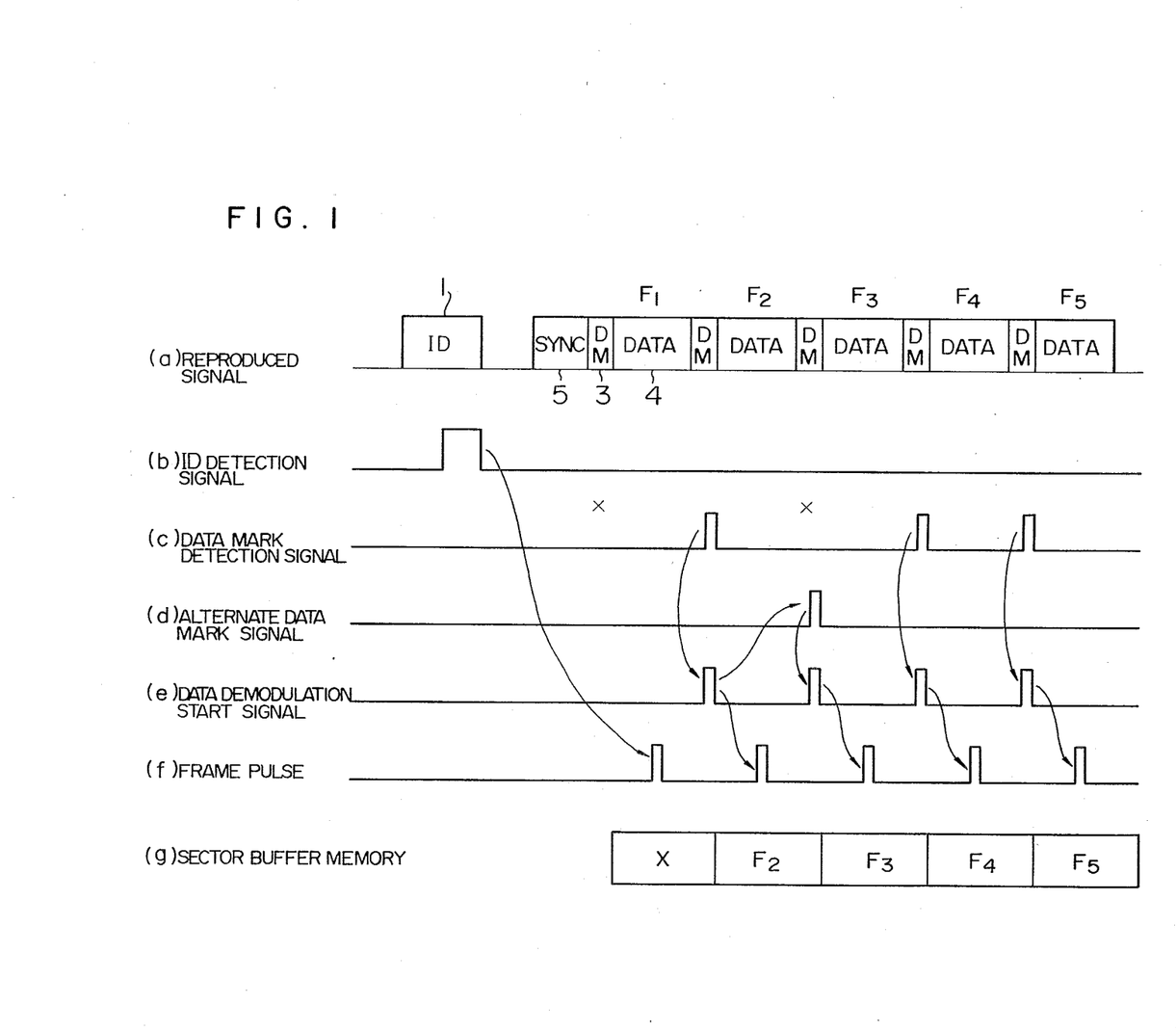
FIG. 1 is a timing chart illustrating the general concept of the present invention.

The general concept of the present invention will be described with reference to FIG. 1. FIG. 1(a) shows a signal reproduced from an optical recording disk of a 5-frame sector data format. The reference numerals 1, 3, and 5 designate a sector identifier ID pre-formatted on the optical recording disk and including sector address information; data marks DM provided for identification of the head of individual frame data 4; and a pull-in signal SYNC for pulling in a PLL, respectively. FIG. 1(b) shows a signal indicative of detection of the sector identifier ID. For example, this signal is indicative of detection of the sector address information included in the sector identifier ID. FIG. 1(c) shows a data mark detection signal indicative of coincidence of the data mark patterns in the reproduced signal. In FIG. 1(c), it is supposed that the data mark patterns of the first and third frames $F_1$ and $F_3$ could not be detected due to, for example, dropouts present on the disk. FIG. 1(e) shows a data demodulation start signal determining the timing of demodulation of data in the unit frames. In the case of the third frame $F_3$, an alternate data mark signal as shown in FIG. 1(d), which signal is produced by counting the PLL clock from the generation timing of the data demodulation start signal for the frame $F_2$, is used to generate the data demodulation start signal for the frame $F_3$. Thus, the demodulated data of the frame $F_1$, for which the data mark could not be detected, can be stored in the assigned position in the sector buffer memory shown in FIG. 13, and the data of any other frame are not stored in that position of the sector buffer memory, as shown in FIG. 1(g). For the purpose of positioning, frame pulses generated at a rate of one for each frame as shown in FIG. 1(f) are utilized. Until the data mark in the frame data is detected, the frame pulse is generated on the basis of the ID detection signal shown in FIG. 1(b), and, once the data mark is detected, the frame pulse is generated on the basis of the data demodulation start signal produced on the basis of the detected data mark.

Figure 2:
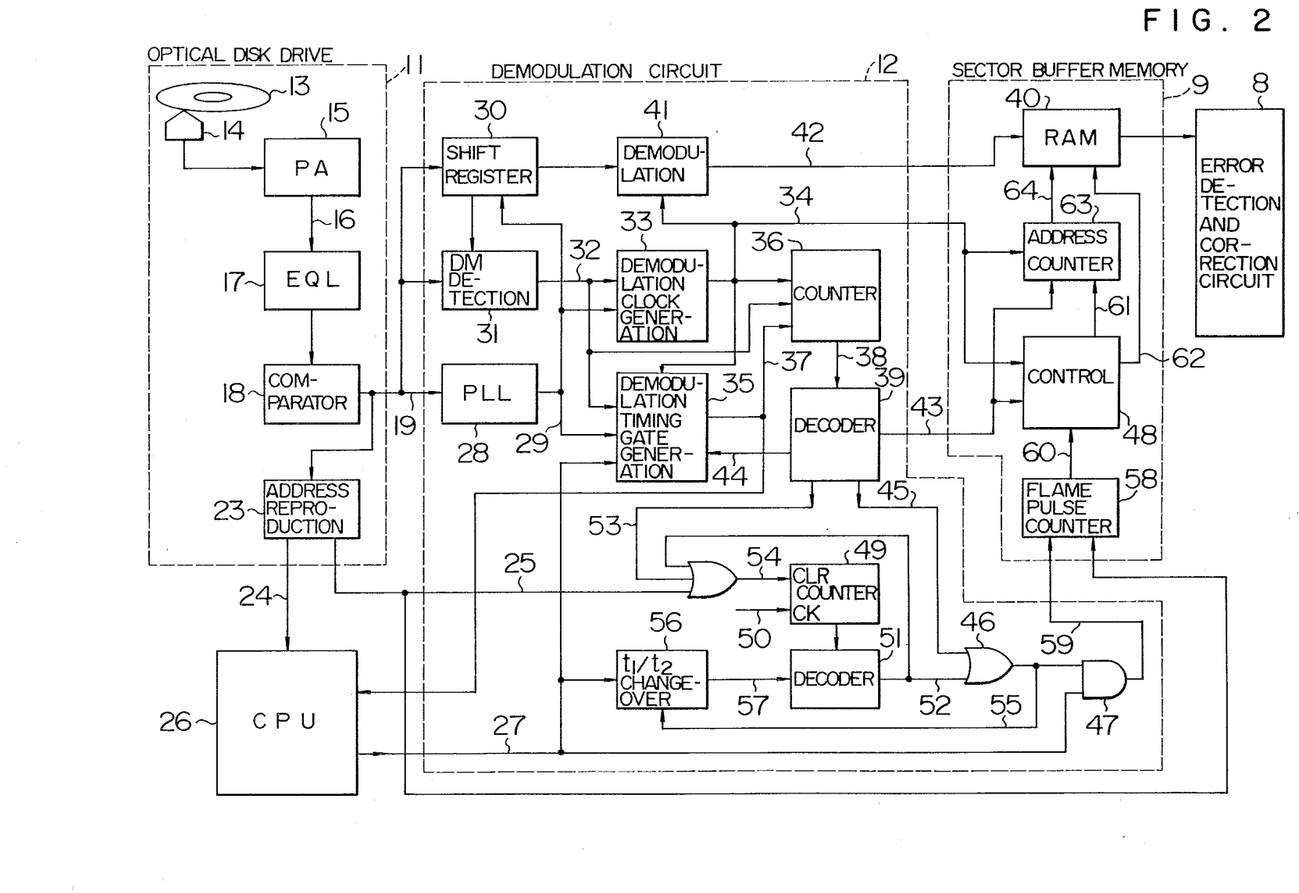
FIG. 2 is a block diagram showing the structure of an embodiment of the information recording and reproducing apparatus according to the present invention.
Figure 3:
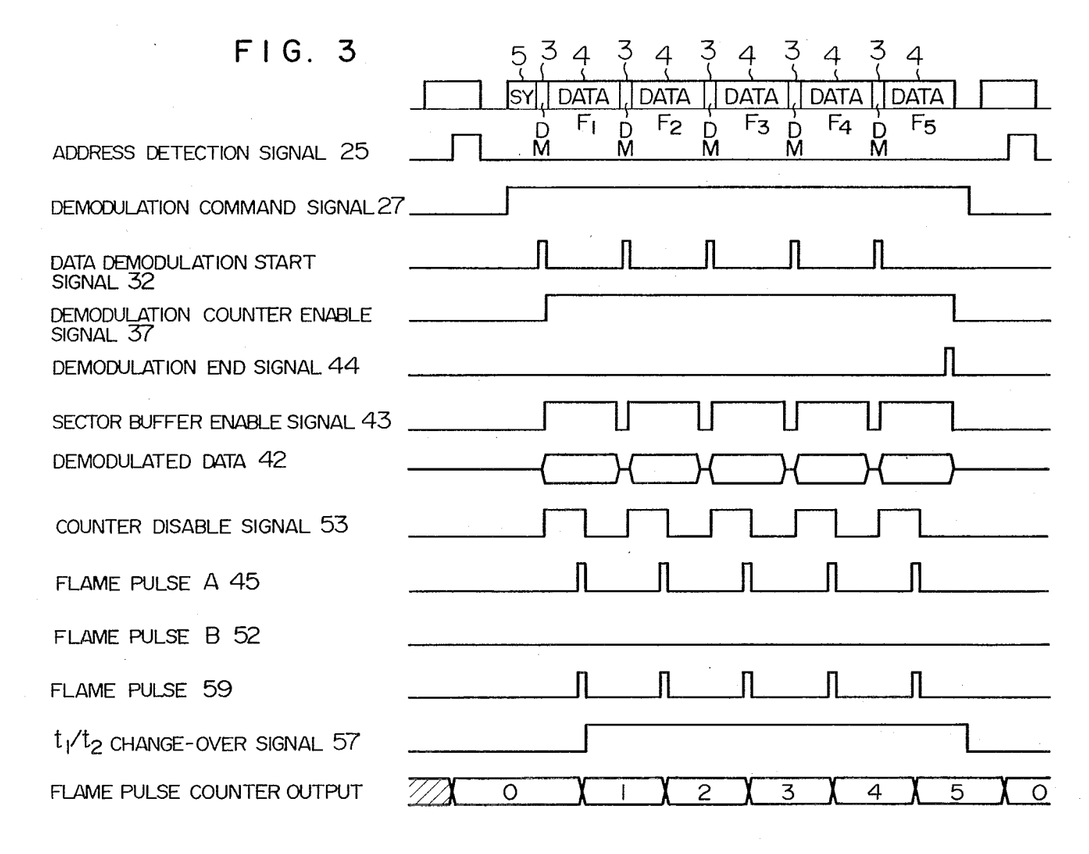
FIG. 3 is a timing chart of the operation of the apparatus shown in FIG. 2 in a normal demodulation sequence.
Figure 4:
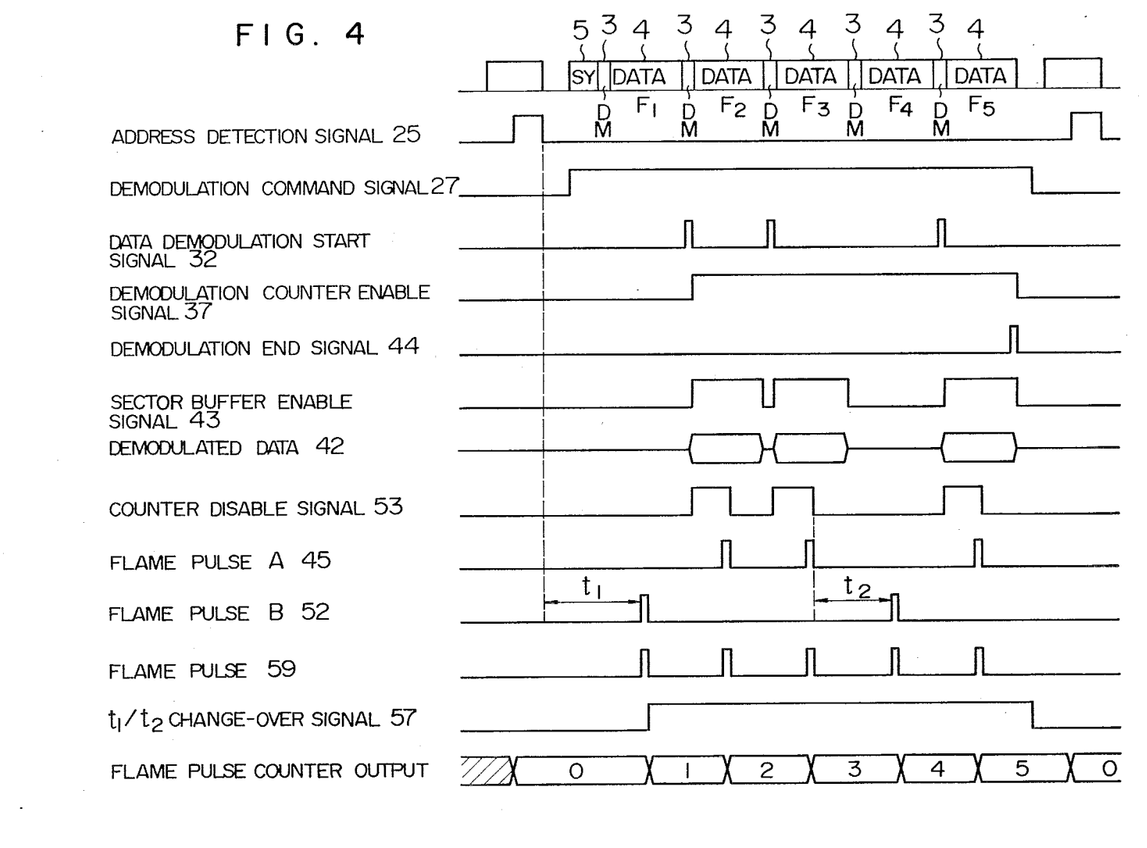
FIG. 4 is a timing chart of the operation of the apparatus shown in FIG. 2 in an abnormal demodulation sequence in which a data mark is not detected.

FIG. 2 is a block diagram showing the structure of an embodiment of the present invention when applied to the optical information recording and reproducing apparatus shown in FIG. 13, FIG. 3 is a timing chart of the operation of the apparatus in a normal demodulation sequence, and FIG. 4 is a timing chart of the operation of the apparatus in an abnormal demodulation sequence in which a data mark is not detected. The present invention will now be described in detail with reference to FIGS. 2, 3 and 4.

In the optical disk drive 11, a signal 16 is reproduced from an optical recording disk 13 by an optical detector 14 and is amplified by a preamplifier 15. After the reproduced signal 16 is wave-shaped in a waveform equalizer circuit 17, the signal 16 is binary-coded in a comparator 18 to appear as a binary-coded reproduced signal 19 which is applied to a demodulation circuit 12 and to an address reproduction circuit 23. In the address reproduction circuit 23, the address information included in the sector identifier ID is read out, and a reproduced address signal 24 indicative of the track address and sector address of the sector is applied from the address reproduction circuit 23 to a CPU 26. Also, in the address reproduction circuit 23, an error-detecting code in the sector identifier is checked, and, when no error is detected in the address information, an address detection signal 25 is applied from the address reproduction circuit 23 to the demodulation circuit 12.

The CPU 26, which controls demodulation of sector data, confirms the reproduced address signal 24 and applies a demodulation command signal 27 to the demodulation circuit 12.

In response to the application of the binary-coded reproduced signal 19 to a PLL circuit 28 in the demodulation circuit 12, the PLL circuit 28 itself generates a regenerative clock signal 29, and, according to this clock signal 29, the binary-coded reproduced signal 19 is applied to a shift register 30. The binary-coded reproduced signal 19 is applied also to a data mark detection circuit 31 where the data mark is detected by detecting coincidence of the data mark pattern attached to the head of each frame, and a data demodulation start signal 32 for data demodulation is applied from the data mark detection circuit 31 to a demodulation clock generation circuit 33 to which the clock signal 29 is also applied. In response to the application of the regenerative clock signal 29 and the data demodulation start signal 32, the demodulation clock generation circuit 33 generates a demodulation clock signal 34 used for word synchronization. An enable signal 37 enabling a counter 36 counting the demodulation clock signal 34 appears from a demodulation timing gate generation circuit 35, and the output 38 of the counter 36 is decoded by a decoder 39. The decoder 39 generates a sector buffer enable signal 43 used for transferring frame data 42 demodulated by a demodulator 41 to a RAM 40 in the sector buffer memory 9. The demodulation clock signal 34 and the enable signal 37 enabling the counter 36 are initialized by the data demodulation start signal 32 so that demodulation of frame data can be started.

After reproduced data in each unit frame have been demodulated, and demodulation of frame data in a predetermined number of frames has been completed, a demodulation end signal 44 is applied from the decoder 39 to the demodulation timing gate generation circuit 35, and the demodulation counter enable signal 37 is disabled. By detecting this disabling of the demodulation counter enable signal 37, the CPU 26 recognizes the end of the demodulation and releases the demodulation command signal 27.

Basically, a frame pulse A is generated as a decoded output 45 of the decoder 39 in the middle of each frame from which the data mark is detected. This frame pulse A is applied through an OR gate 46 to an AND gate 47. The demodulation command signal 27 is also applied to this AND gate 47 so that its output 59 which is the frame pulse can be applied to a RAM control circuit 48 in the sector buffer memory 9 in the demodulation mode only. A crystal clock 50 is counted by a counter 49, and the output of the counter 49 is decoded by a decoder 51, so that, when the data mark in a frame cannot be detected, a frame pulse B provided by the output 52 of the decoder 51 can be used in lieu of the frame pulse A.

The address detection signal 25, the frame pulse signal B, and a count disable signal 53, which is maintained in its "H" level from the time of data mark detection to the time of generation of the frame pulse A in the middle of each frame, are applied to an OR gate whose output 54 is used to clear the counter 49. Therefore, as shown in FIG. 4, the alternate frame pulse B is generated from the decoder 51 at time at which the counter 49 has counted the crystal clock 50 for a period of time $t_1$ from the time of generation of the address detection signal 25 to the time corresponding to the middle of the first frame $F_1$. Also, as seen in FIG. 4, the frame pulse B is generated from the decoder 51 at time at which the counter 49 has counted the crystal clock 50 for a period of time $t_2$ corresponding to the length of one frame. As soon as the first frame pulse 55 is generated from the OR gate 46, a $t_1/t_2$ change-over signal 57 is generated from a $t_1/t_2$ change-over circuit 56 so as to change the position of the decoder output 52 which provides the frame pulse B.

Thus, until the data mark is first detected, the frame pulse is generated on the basis of the sector identifier detection signal, and, once the data mark is detected, the frame pulse is generated on the basis of the detected data mark. Therefore, the frame pulse for each frame can be accurately generated. A frame pulse counter 58 is provided in the sector buffer memory 9. The address detection signal 25 and the frame pulse signal 59 are applied to this counter 58 as a clear input and a clock input respectively. The output 60 of this counter 58 is applied to the RAM control circuit 48, and an address signal 61 indicative of the head address of frame data of each frame to be stored in the RAM 40 is applied from the RAM control circuit 48 to a RAM address counter 63. The RAM control circuit 48 applies a data write command signal 62 to the RAM 40 so that frame data can be stored in the RAM 40. The demodulation clock signal 34 used for demodulation of unit words is applied as a clock input to the RAM address counter 63. The output 64 of the RAM address counter 63 is applied together with the data write command signal 62 to the RAM 40 to store the demodulated frame data 42 in the RAM 40.

The address signal 61 is preferably loaded in the RAM address counter 63 during the period of time, in which, for example, the sector buffer enable signal 43 is in its "L" level. Thus, even when, for example, the first data mark cannot be detected, and the corresponding sector buffer enable signal 43 is not generated as shown in FIG. 4, the frame data in the next frame can be stored at the assigned address in the sector buffer memory 9.

Further, the frame pulse is generated in about the middle of each frame according to the present invention. This is advantageous in that changes in the detected sector length relative to time due to vibration, shock, eccentricity of the disk, etc. and resulting from variations of the rotation speed of the disk can be absorbed.

In the embodiment of the present invention, the frame pulse is produced on the basis of the data demodulation start signal 32 as described above. Therefore, the reliability of the data demodulation start signal 32 generated from the data mark detection circuit 31 must be very high. However, since the raw bit error rate of an optical recording disk is very bad or in the order of $10^{-4}$ to $10^{-5}$, the data mark pattern may not be detected or a spurious data mark may be detected in the data row, with the result that the data demodulation start signal 32 may not appear at the proper position, and the timing of data demodulation may get out of order giving rise to a demodulation error.

Therefore, in order to improve the positional accuracy of the data demodulation start signal 32 generated from the data mark detection circuit 31, an alternate data mark is produced in the present invention to compensate failure to detect the data mark in an intermediate frame, and mask gate signals are produced from the detected data mark and the alternate data mark respectively for masking any spurious data mark pattern which will dislocate the proper timing of data demodulation, thereby accurately generating the data demodulation start signal 32 at the proper position. Thus, the present invention prevents appearance of a data demodulation error and improves the reliability of the frame pulse.

Figure 5:
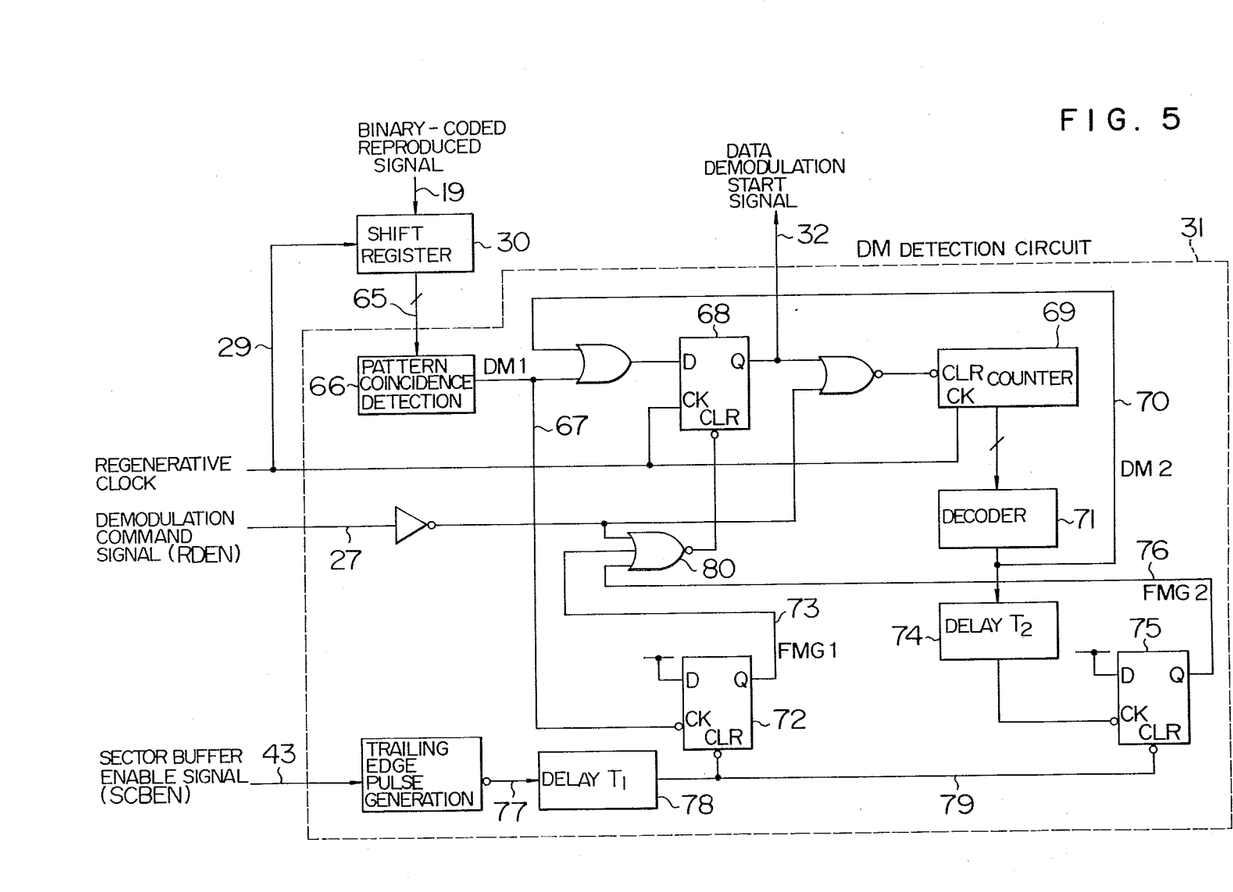
FIG. 5 is a block diagram showing the structure of the DM detection circuit in the apparatus shown in FIG. 2.

FIG. 5 shows in detail the structure of the data mark detection circuit 31 in the embodiment shown in FIG. 2. Basically, the data mark included in the output 65 of the shift register 30 is compared with the data mark pattern in a pattern coincidence detection circuit 66, and a data mark coincidence detection signal 67 (referred to hereinafter as a signal DM1) generated from the pattern coincidence detection circuit 66 as a result of detection of the data mark pattern in the data row is synchronized with the regenerative clock signal 29 in a flip-flop 68 to generate the data demodulation start signal 32 (referred to hereinafter as a signal DM). To deal with the case where occurrence of a bit error in the proper data mark pattern results in impossibility of pattern detection, a counter 69 is initialized by the signal DM to count the regenerative clock signal 29, and a decoder 71, to which the output of the counter 69 is applied, is so set that an alternate data mark signal 70 (referred to hereinafter as a signal DM2) can be generated from the decoder 71 at the time at which the signal DM1 in the next frame is to be detected. Thus, even if the signal DM1 may not be generated, that frame can be accurately demodulated on the basis of the signal DM2.

Further, a flip-flop 72 is triggered by the trailing edge of the signal DM1 to generate a mask gate signal 73 (referred to hereinafter as a signal FMG1) which is used to prevent generation of the signal DM. Also, another flip-flop 75 is triggered by the trailing edge of the signal DM2 delayed by a time $T_2$ by a delay circuit 74 to generate another mask gate signal 76 (referred to hereinafter as a signal FMG2) which is also used to prevent generation of the signal DM. A trailing edge pulse 77 produced from the sector buffer enable signal 43 is delayed by the time $T_1$ by a delay circuit 78, and such a pulse is applied to the flip-flops 72 and 75 to release the mask gate signals FMG1 and FMG2. These two mask gate signals are applied through a NOR gate 80 to the clear terminal of the flip-flop 68, so that, during the period of time in which demodulation of a frame is executed as a result of detection of the data mark of that frame, the signal DM may not be generated even when the signal DM1 may be detected in the data row by mistake. The signal DM is also masked by the demodulation command signal 27 (RDEN), so that the signal DM may not be generated in the period except the RD period, and the demodulating operation may not be executed.

Figure 6:
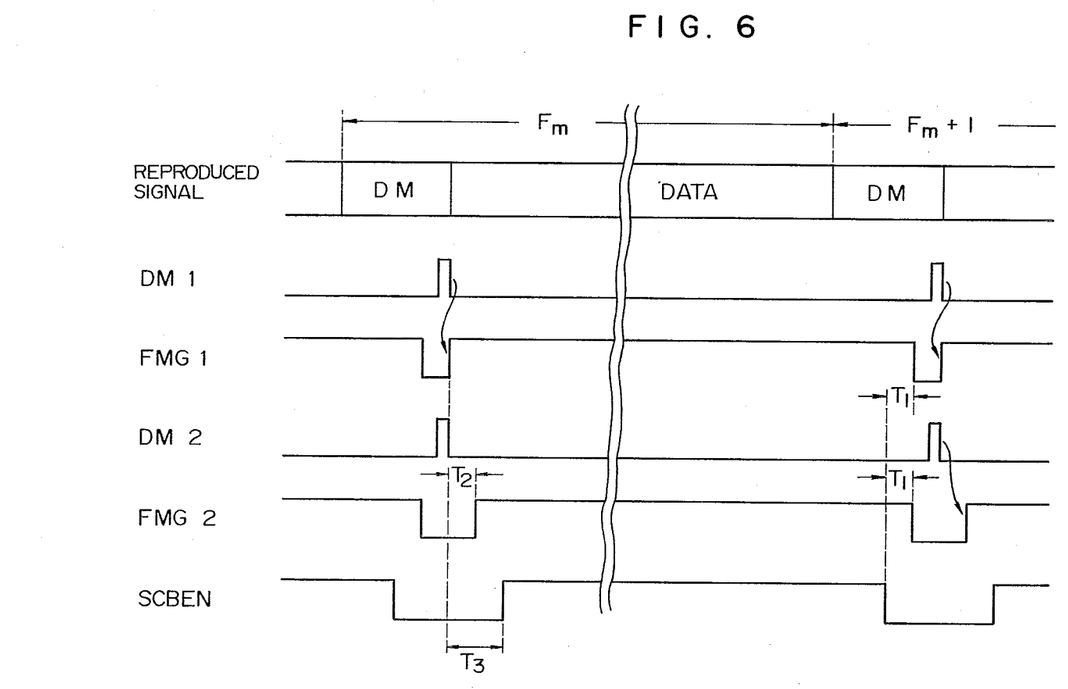
FIGS. 6 to 10 are timing charts of the operation of the DM detection circuit shown in FIG. 5.

FIG. 6 is a timing chart of the operation of the DM detection circuit shown in FIG. 5. An m-th frame ($F_m$) and a portion of an (m+1)-th frame ($F_{m+1}$) are illustrated in FIG. 6. In the frame $F_m$, the mask gate signal FMG1 is generated as soon as the data mark coincidence detection signal DM1 detecting coincidence of a special pattern is detected. However, the alternate data mark signal DM2 is generated from the decoder 71 connected to the counter 69 counting the regenerative clock pulses 29 corresponding to one frame from the time of appearance of the data demodulation start signal 32 in the directly preceding frame $F_{m-1}$. In this case the alternate data mark signal DM2 may not appear at the proper position if the operation of the PLL servo is disturbed due to the presence of a burst-like dropout, and the number of the regenerated clock pulse 29 corresponding to one frame is increased or decreased. Therefore, the reliability of the alternate data mark signal DM2 is lower than that of the data mark coincidence detection signal DM1, and the mask gate signal FMG2 is delayed by a time $T_2$ relative to the signal DM2. According to such an arrangement, the mask gate signal FMG2 does not appear in the period of time $T_2$ even when the number of the regenerative clock pulse 29 in one frame is large, and the signal DM2 is generated before the signal DM1 is generated. As described with reference to FIG. 2, the demodulation clock signal 34 and the counter enable signal 37 are initialized by the data demodulation start signal 32 before demodulation of the frame $F_m$. Therefore, the data mark coincidence detection signal DM1 generated later than alternate data mark signal DM2 has the priority, so that the frame data can be demodulated at the proper timing.

The sector buffer enable signal (SCBEN) 43 is generated in a relation delayed by a demodulation processing time $T_3$ from the time of data mark detection, and the length of the enable period is the same as the length of the data part. In order that the mask gate signals FMG1 and FMG2 can cover a longest possible period, these signals are released with the delay time $T_1$ after disappearance of the sector buffer enable signal SCBEN indicative of the period of data demodulation. The values of $T_1$ and $T_2$ are determined by the maximum number of regenerative clock pulses per frame which is variable depending on the maximum length of burst errors occurring on the disk and also depending on the performance of the PLL.

FIGS. 7 to 10 are timing charts of the operation of the DM detection circuit when the data mark is not detected or when a spurious data mark is detected.

Figure 7:
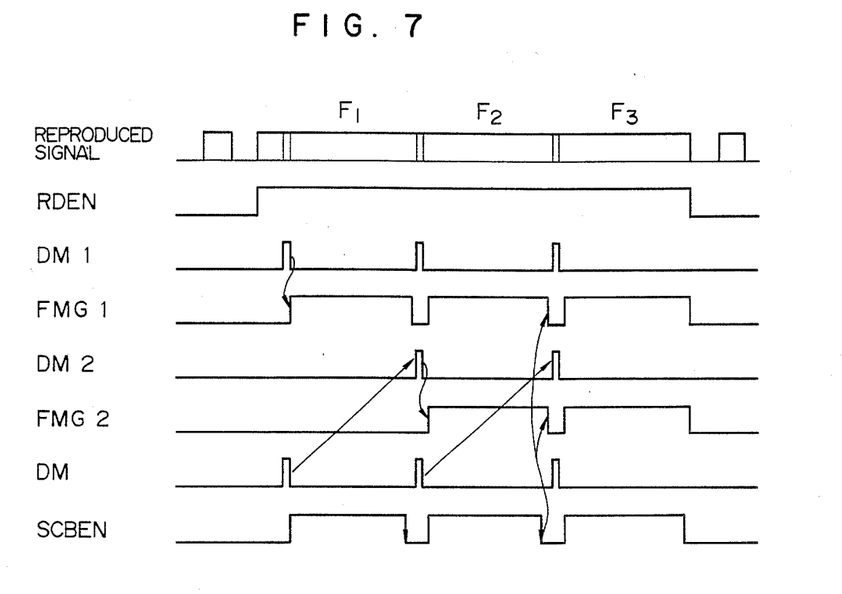

FIG. 7 is a timing chart of the operation of the DM detection circuit in a normal sequence. The data mark coincidence detection signal DM1 is detected from the reproduced signal of each frame, and the data mark signal DM is generated to start demodulation of the frame. The alternate data mark signal DM2 is generated by counting the PLL-regenerated clock pulses from the position of the signal DM in the directly preceding frame. The mask gate signals FMG1 and FMG2 are triggered by the trailing edge of the signal DM1 and that of the delayed signal DM2 respectively and are reset by the trailing edge of the sector buffer enable signal (SCBEN) 43.

Figure 8:
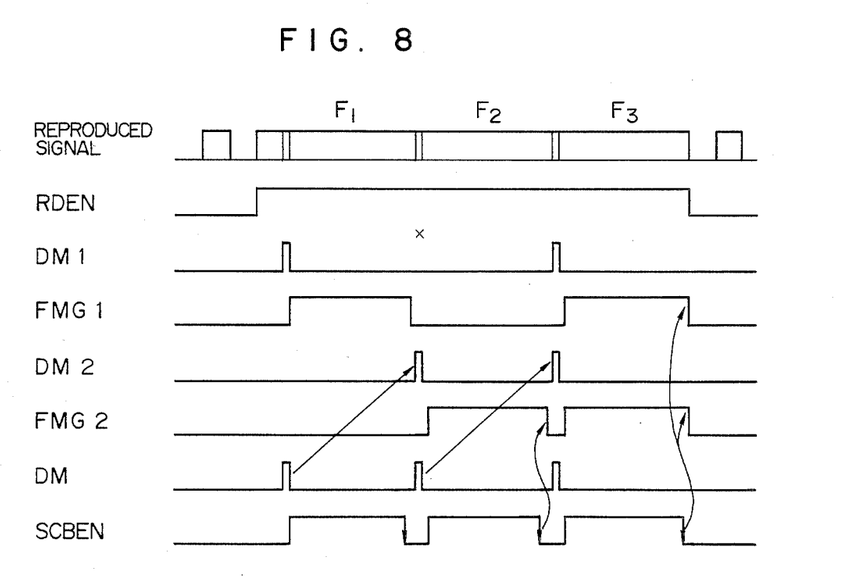

FIG. 8 is a timing chart of the operation of the DM detection circuit when the data mark of the second frame $F_2$ cannot be detected due to the presence of a bit error. In such a case, the signal DM2 produced on the basis of the signal DM generated in the first frame $F_1$ acts as an alternate, so that demodulation of the frame $F_2$ can be accurately executed at the normal timing.

Figure 9:
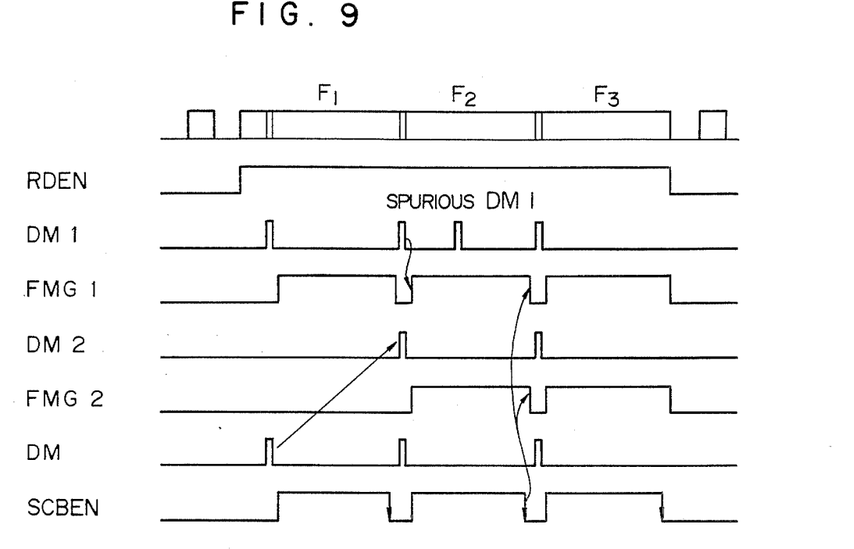

FIG. 9, is a timing chart of the operation of the DM detection circuit when a spurious signal DM1 is detected in the data of the second frame $F_2$. In such a case, the spurious signal DM1 is masked by the signals FMG1 and FMG2 and does not exert any adverse effect on the demodulation.

Figure 10:
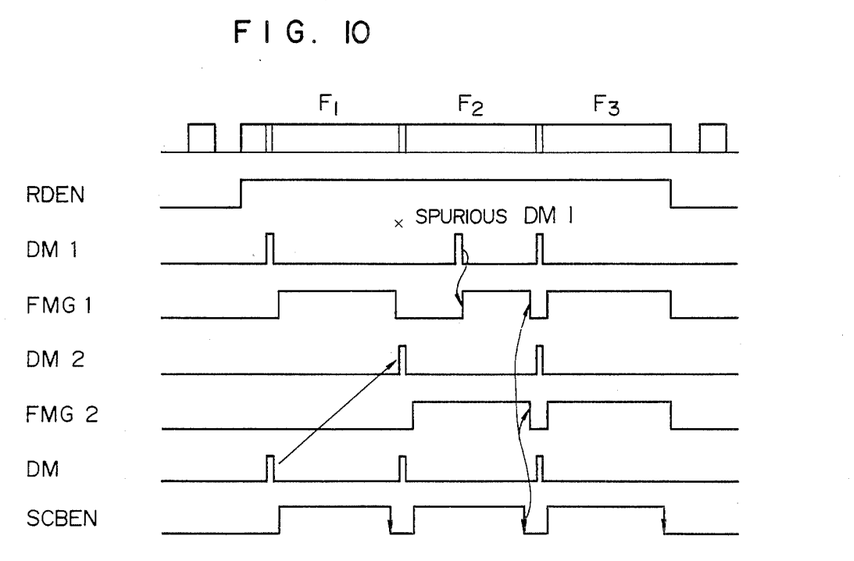

FIG. 10 is a timing chart of the operation of the DM detection circuit when the data mark of the second frame $F_2$ cannot be detected, and, in addition, a spurious signal DM1 is detected in the middle of the frame $F_2$. In such a case too, the demodulation of the frame $F_2$ is ensured by the signal DM2, and the spurious signal DM1 appearing in the frame $F_2$ in the period in which the signal FMG1 is absent, is also masked by the signal FMG2 without adversely affecting the demodulation of the frame $F_2$.

Thus, by the provision of data mark alternating means and mask gate optimizing means for masking detection of a spurious data mark, the data demodulation start signal 32 can be accurately generated at the regular position, and variations of the position and number of frame pulses that may occur due to failure to detect a data mark or detection of a spurious data mark can be reliably prevented.

It will be understood from the foregoing detailed description that the present invention provides an information recording and reproducing apparatus adapted for recording and reproduction of data on and from an optical recording disk having a sector format of the type dividing sector data into a plurality of frames, in which, in the data reproduction mode, the frame numbers of frame data demodulated and stored in a sector buffer memory are accurately detected, and, even if the data mark of a frame cannot be detected resulting in dropout of data in that frame, the succeeding frame data can be reliably stored at the assigned addresses in the sector buffer memory.

In order that one pulse (a frame pulse) can be reliably generated for each of the frames, a sector identifier detection signal is based for generation of the frame pulse until the data mark is first detected to generate a data demodulation start signal, and, once the data demodulation start signal is generated, the frame pulse is generated on the basis of the generated data demodulation start signal. Thus, the frame pulse can be accurately generated for each of the frames. Further, an alternate data mark signal is generated to compensate failure to detect the data mark in an intermediate frame, and mask gate signals are produced on the basis of the detected data mark and the alternate data mark respectively for masking a spurious data mark which may dislocate the proper timing of data demodulation. Therefore, the data demodulation start signal can be reliably generated to prevent dropout of demodulated data and to improve the accuracy of frame pulses.

We claim:

1. An information recording and reproducing apparatus for recording and reproducing data on and from a recording medium having a sector structure which comprises a plurality of sectors, each having a sector identifier portion including address information and a data field portion divided into a plurality of record units, each record unit including modulated data and an associated data head identification mark, said apparatus comprising:

means for identifying the address information included in the sector identifier of a reproduced signal thereby identifying a target sector from which recorded data are to be reproduced;

means for recording a succession of plural information record units, each including modulated data and a data head identification mark for identification of the head of the modulated data, on the data field portion of each sector;

means for detecting and identifying the data head identification mark for reproduced record units of a reproduced signal;

means for producing a data demodulation start signal for each detected data head identification mark;

means for detecting a sector identifier and producing a sector identifier detection signal;

means for demodulating the data contained in each of the information record units in response to the data demodulation start signals and storing the demodulated data in a sector buffer memory;

means for producing and counting one pulse for each of the information record units of a reproduced signal and operative according to the pulse counting result, to assign a head address in each of the information record units to be stored in said sector buffer memory, said producing and counting means including means for producing said pulse for each of the information record units on the basis of said sector identifier detection signal until a said data head identification mark is detected to generate said data demodulation start signal, and, once a said data head identification mark is detected, to produce said pulse on the basis of said data demodulation start signal.

2. An apparatus as claimed in claim 1, wherein said sector identifier detection signal is a signal indicative of detection of the address information included in the sector identifier.

3. An apparatus as claimed in claim 1, further comprising means for producing said data demodulation start signal for a given record unit on the basis of the occurrence of either one of a) said data head identification mark being detected for said given information record unit and b) an alternative data head identification mark produced from the data demodulation start signal for a just preceding information record unit.

4. An apparatus as claimed in claim 3, wherein when said data head identification mark is not detected in one of the information record units, said data demodulation start signal is produced on the basis of said alternative data head identification mark.

5. An apparatus as claimed in claim 3, further comprising:
means for producing a first gate signal and a second gate signal on the basis of said data head identification mark and said alternative data head identification mark, respectively, with a period of said second gate signal being shorter than a period of said first gate signal; and
means for preventing the production of said data demodulation start signal during the period of time in which one of said first and second gate signals is produced.

6. An apparatus as claimed in claim 1, wherein said pulse is produced at about a middle of each of the information record units.

* * * * *